UNITED STATES PATENT OFFICE.

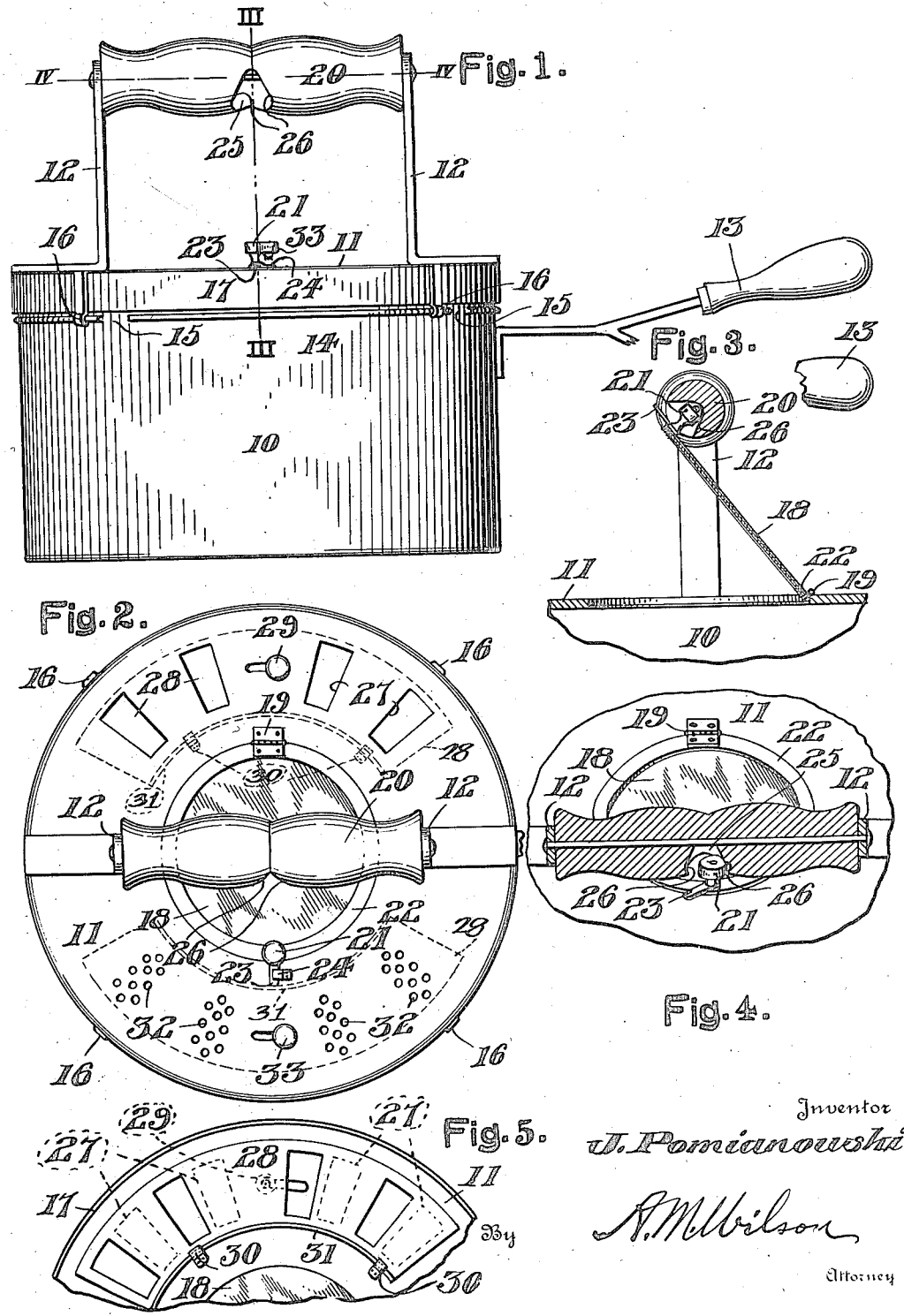

JOSEPH POMIANOWSKI, OF CHICAGO, ILLINOIS.

MACARONI-COOKER.

1,231,192. Specification of Letters Patent. Patented June 26, 1917.

Application filed December 14, 1916. Serial No. 136,920.

*To all whom it may concern:*

Be it known that I, JOSEPH POMIANOWSKI, a citizen of the United States, residing at Chicago, in the county of Cook and State of Illinois, have invented certain new and useful Improvements in Macaroni-Cookers, of which the following is a specification.

This invention relates to new and useful improvements in macaroni cookers.

The primary object of the invention is the provision of a cooking utensil especially adapted for preparing macaroni and potatoes ready to serve, the arrangement being such that an upper portion of the device may be maintained open when desired and the top fluid may be drained off without injury to the hands of the operator.

A further object of the device is the provision of a cooking utensil which is easy and inexpensive to manufacture and by means of which macaroni may be advantageously cooked, provision being made for free visual access to the contents of the utensil as well as for regulating the heat therein and safely draining the contained fluid therefrom.

With these general objects in view, the device consists of the novel combination and arrangement of parts hereinafter fully described and illustrated in the accompanying drawing, in which like reference characters designate corresponding parts throughout the several views:

Figure 1 is a side elevation of the device,

Fig. 2 is a top plan view thereof, with the side handle removed,

Fig. 3 is a vertical sectional view taken upon line III—III of Fig. 1,

Fig. 4 is a horizontal sectional view taken upon line IV—IV of Fig. 1 with the window open, and Fig. 5 is a bottom plan view of a side portion of the lid of the device with the drain openings closed.

The present device being serviceable for cooking different articles such as macaroni, the same broadly consists of a pot or receptacle 10, having a removable lid or cover 11, the latter having a bail or handle 12 fixedly mounted thereon, while a laterally projecting double handle 13 is secured to the side of the pot 10.

An interrupted bead 14 is provided in spaced relations with the upper rim of the pot 10 having interrupted portions 15 adapted for the reception therein of depending hooks 16 carried by the outer flange 17 of the cover 11, the side hooks being adapted to engage over the adjacent portions of the bead 14, by slightly revolving the cover upon the pot, thereby removably securing the cover thereon.

A centrally arranged window 18 is hinged as at 19 to the cover 11, the same being formed of any transparent material, such as mica whereby the contents of the pot 10 may be readily viewed. The said window 18 is arranged beneath the wooden hand piece 20 of the bail handle 12 and is provided with a hand knob 21 rotatably carried by the frame 22 of the window and having a latch finger 23 adapted for engaging a clip 24 upon the cover 11 when it is desired to secure the window 18 in its closed position. It will be understood, that in addition to the bail handle 12 and hand piece 20 being provided for lifting the vessel, the relative positions of the same with respect to the window 18 affords a protection for the window. A socket 25, of irregular form, is arranged in the lower side portion of the hand piece 20, the same being gouged out in a manner to provide inwardly projecting edges 26. One of the edges 26 lies in the plane of the knob 21 during its opening path of travel, whereby the knob 21 may enter the socket 25 and spring beneath the adjacent edges 26 thereof for temporarily retaining the window 18 in its open position as best illustrated in Fig. 4 of the drawing. The knob 21 is readily removed from the socket 25 when desired to close the window 18, it being understood that the construction of the said window knob and its hinge 19 is such as to permit such engagement of the knob with the edge 26, by reason of the slight resiliency of the said elements.

Drain openings 27 are radially provided through the cover 11 having a closing damper 28 flatly arranged within the cover, being of arcuate shape to substantially conform thereto and readily shifted by means of a hand knob 29 after the usual manner of a damper construction. The said damper 28 is secured to the cover 11 by suitable clips 30 overlying and engaging the flange 31 of the said damper.

A plurality of series of steam outlet perforations 32 are provided in the cover 11 opposite the drain openings 27, while a similar damper is provided for the perforations operable by means of a push knob 33, it being understood that the perforations 32 will be covered when the knob 33 is in one position but will be uncovered when the same is oppositely arranged.

A serviceable cooking utensil is provided in which the cover 11 may be readily removed while the fluid contents may be drained from the pot 10 when the cover is positioned thereon by opening either the drain openings 27 or the steam outlet perforations 32 and tilting the pot while holding the same by means of the handle 13. The bail handle 12 may be utilized for carrying the pot when the drain and steam outlets are closed, while the window 18 is readily maintained temporarily open by means of the engagement of the knob 29 within the socket 25.

What I claim as new is:

1. In a macaroni cooker comprising a pot having a cover provided with a centrally located opening, a hinged transparent window for said opening, a fixed bail upon said cover spanning said window and having the hand piece thereof provided with a socket having flanged edges, said window being provided with a knob swinging with the opening movement of the window into frictional retaining engagement with one of said edges.

2. A macaroni cooker comprising a pot having an outwardly projecting bead spaced from the upper rim of the pot and provided with interrupted portions, a closure cover for the said pot having a central opening and an annular flange arranged adjacent the said bead when the cover is closed, depending hooks carried by the said flange adapted for detachable engagement with the bead through the said interrupted portions thereof, a hinged transparent window for said cover opening, damper-controlled draining means at one side of the cover, damper-controlled steam outlet means at the opposite side of the cover, and a bail handle carried by the cover overlying said window, and coöperating means carried by the said window and handle adapted for operative engagement when the window is open to retain the window in open position.

In testimony whereof I affix my signature.

JOSEPH POMIANOWSKI.